United States Patent
Kosanda et al.

(10) Patent No.: US 7,090,777 B2
(45) Date of Patent: Aug. 15, 2006

(54) AGGREGATION PRECIPITATION METHOD

(75) Inventors: Sakae Kosanda, Kanagawa (JP); Hirotoshi Hinuma, Kanagawa (JP); Naohiro Tateishi, Kanagawa (JP); Kenji Hata, Tokyo (JP); Ken Suzuki, Tokyo (JP); Tomoichi Fujihashi, Tokyo (JP)

(73) Assignee: Ebara Corporation, Tokyo (JP)

( * ) Notice: Subject to any disclaimer, the term of this patent is extended or adjusted under 35 U.S.C. 154(b) by 104 days.

(21) Appl. No.: 10/484,301

(22) PCT Filed: Jun. 6, 2003

(86) PCT No.: PCT/JP03/07196

§ 371 (c)(1), (2), (4) Date: Jan. 20, 2004

(87) PCT Pub. No.: WO03/104151

PCT Pub. Date: Dec. 18, 2003

(65) Prior Publication Data

US 2005/0000910 A1 Jan. 6, 2005

(30) Foreign Application Priority Data

Jun. 6, 2002 (JP) .............................. 2002-165205

(51) Int. Cl.
*C02F 1/56* (2006.01)

(52) U.S. Cl. .................. 210/709; 210/715; 210/728

(58) Field of Classification Search ............. 210/702, 210/709, 725, 728, 738, 207, 208, 522
See application file for complete search history.

(56) References Cited

U.S. PATENT DOCUMENTS

| | | | | |
|---|---|---|---|---|
| 1,752,795 | A * | 4/1930 | Hoover et al. | 210/713 |
| 1,794,374 | A * | 3/1931 | Graham et al. | 209/208 |
| 2,213,808 | A * | 9/1940 | Von Stietz | 210/713 |
| 3,010,581 | A * | 11/1961 | Knapp et al. | 210/151 |
| 3,313,725 | A * | 4/1967 | Koh Tsuda et al. | 210/715 |
| 3,495,254 | A * | 2/1970 | Clemens | 210/522 |
| 4,388,195 | A * | 6/1983 | von Hagel et al. | 210/709 |
| 6,358,407 | B1* | 3/2002 | Liao et al. | 210/97 |
| 6,482,320 | B1 | 11/2002 | Kosanda et al. | |

FOREIGN PATENT DOCUMENTS

| | | |
|---|---|---|
| JP | 42-025986 | 12/1967 |
| JP | 49-052441 | 5/1974 |
| JP | 58-189008 | 11/1983 |
| JP | 6-039761 | 10/1994 |
| JP | 02002001011 A * | 1/2002 |

* cited by examiner

*Primary Examiner*—Peter A. Hruskoci
(74) *Attorney, Agent, or Firm*—Oblon, Spivak, McClelland, Maier & Neustadt, P.C.

(57) ABSTRACT

The present invention has an object to provide a compact aggregation precipitation method and an apparatus therefor which prevent the outflow of flocs and do not deteriorate the turbidity elimination performance even in start-up early stages. As the means to accomplish such an object, the present invention provides a method of adding an inorganic flocculant and, optionally, an organic polymer flocculent to the water to be treated and agitating the resulting mixture to effect aggregation precipitation treatment which comprises introducing the agitated solution into a first chamber of a separation tank where flocs are allowed to grow to effect solid-liquid separation and, simultaneously, the separated water is discharged out of the separation tank.

5 Claims, 5 Drawing Sheets

AGGREGATION PRECIPITATION METHOD

TECHNICAL FIELD

The present invention relates to an aggregation precipitation treatment, and particularly it relates to an aggregation and precipitation method of the upward flow type comprising adding a flocculant to raw water to aggregate and precipitate suspended substances in treating sewage, waste water, river water increased in pollution, lake and marsh water, and rain water, and an apparatus therefor.

BACKGROUND ART

Of methods of separating suspended substances present in raw water, a method comprising adding a flocculant to the raw water, allowing the raw water to flow as an upward flow in a separation tank to aggregate pollutants and settling and separating them as coarse particles (flocs), is broadly used.

The treatment velocity in the conventional aggregation precipitation method of the upward flow type (the term "treatment velocity" means herein a flow velocity found by dividing the water amount of the water to be treated by the sectional area of a tank) is restrained by the settling velocity of flocs and cannot be faster than the settling velocity of the flocs. Further, even if the treatment velocity is lower than the settling velocity of the flocs, when the flow velocity is not uniform, the settling of flocs is hindered. Particularly, the upward flow velocity in the neighborhood of the influent section of the raw water is higher than the settling velocity of the flocs, and not only hinders the settling of flocs but also invites the fragmentation of flocs. This can be said independently of whether or not the formation of a blanket layer, in other words, a retention layer of coarse flocs is caused in the course of treatment.

In the aggregation precipitation of the upward flow type accompanying the formation of a blanket layer of flocs, fine flocks and an unaggregated turbidity component are brought into contact with flocs forming the blanket layer and trapped in passing through the blanket layer and as a result, the elimination of turbidity is accelerated, and simultaneously the settling properties of flocs are improved. However, when the blanket layer is formed to improve the settling properties, with increased treatment velocities, the formation of the blanket layer is hindered to cause an overflow of flocs.

On the other hand, as the treatment system which makes the treatment velocity higher than that of the conventional aggregation precipitation treatment, there is a system of installing a concentration tank below a separation tank and connecting the separation tank with the concentration tank by a floc transfer pipe. The flocs formed in the separation tank settle in the flock transfer pipe by the descending flow caused by the settling of flocks as such, and are transferred to the concentration tank, then concentrated and discharged. The separated water to be formed by the concentration process is affected by the above-described descending flow of flocs and returned as a flow to the separation tank.

However, according to this system, the transfer of flocs and water from the separation tank to the concentration tank depends on the descending flow caused by the settling of the flocs as such, and accordingly it is impossible to arbitrarily control the amount of water to be transferred from the separation tank to the concentration tank, and the treatment velocity must depend on the settling velocity of flocs. Furthermore, the function of the concentration tank is only to gravitationally concentrate the influent flocs flown from the separation tank and has no function of positively effecting solid-liquid separation to obtain clear separated water as the separation tank.

As a problem different from the above described problem in the aggregation precipitation method of the upward flow type, the deterioration of the turbidity elimination performance in start-up early stages of the apparatus can be mentioned. This deterioration is a very serious problem in the treatment system accompanying the formation of a blanket layer. Once the blanket layer is formed, fine flocs are brought into contact with large flocs forming the blanket layer, integrated with the flocs, and removed. But in order to form such a blanket layer, it is necessary for fine flocs to repeatedly associate with one another. Thus, on start-up of the apparatus, the treatment is started in a state in the absence of in the blanket layer, and accordingly the property of the treated water is deteriorated until the blanket layer is formed.

The present invention solves the above described problems of the conventional technique and has an object to provide a compact aggregation precipitation method and an apparatus therefor which prevent the outflow of flocs even in the circumstances that the treatment velocity is higher than the settling velocity of flocs and, simultaneously, do not deteriorate the turbidity elimination performance even in start-up early stages of the apparatus.

DISCLOSURE OF THE INVENTION

In order to solve the above described problems, the present invention provides a method of aggregation precipitation treatment of a solution obtained by adding an inorganic flocculant to raw water and mixing and agitating (quickly agitating), which comprises introducing the agitated solution to a first chamber of a separation tank where flocs are allowed to grow and solid-liquid separation is effected and, simultaneously the separated water is discharged out of the tank, allowing the flocs grown in the first chamber and part of the separated water to flow down into a second chamber provided below the first chamber at a velocity higher than the settling velocity of the flocs as such, concentrating the grown flocs to discharge the concentrated slurry in the second chamber, and simultaneously withdrawing the separated water formed by concentrating the flocs and the separated water in the first chamber which has been introduced into the second chamber together with the flocs from the upper part of the second chamber as the separated water.

In the aggregation precipitation method according to the present invention, the amount of flocs to be introduced from the first chamber of the separation tank into the second chamber and the amount of the separated water in the first chamber to be introduced from the first chamber of the separation tank into the second chamber can be controlled by regulating the amount of the separated water to be withdrawn from the second chamber. Further, the flocs and the separated water can be introduced into the second chamber from the first chamber by a floc transfer pipe. In this instance, by regulating the total discharge flow rate of the separated water and the slurry from the second chamber so as to render the flow velocity of a downward flow in the floc transfer pipe 5 m/min or lower, the fragmentation of the flocs In the lower part of the flock transfer pipe is restrained. Or, so as to render the upward flow velocity from the lower end of the floc transfer pipe in the second chamber to a collection pipe for the separated water in the second chamber lower than the settling velocity of the flocs, the effluent amount of the separated water in the second chamber can be automatically controlled by using the turbidity or the concentration of suspended substances of the separated water in the second chamber as an index.

Further, according to the present invention, there is provided an apparatus for aggregating and precipitating a solution obtained by adding an inorganic flocculant to the water to be treated and agitating the resulting solution, which comprises a separation tank; a partition wall to divide the separation tank into a first chamber in its upper part and a second chamber in its lower part, the first chamber having an effluent section for the separated water in the first chamber provided in the upper part of the first chamber and an influent section for the water to be treated provided in the lower part, the second chamber having an effluent section for the separated water in the second chamber provided in the upper part and a slurry drainage section provided in the lower part; a vertical floc transfer pipe having both open ends which penetrates the partition wall to communicate with the first chamber and the second chamber, the upper end of the floc transfer pipe positioning between the effluent section for the separated water in the first chamber and the influent section of the water to be treated in the first chamber, the lower end of the floc transfer pipe positioning between the effluent section of the separated water in the second chamber and the slurry drainage section in the second chamber; and a valve or a pump to regulate the amount of the effluent from the effluent section of the separated water in the second chamber.

In the aggregation precipitation method and apparatus according to the present invention, it is preferred to add an organic polymer flocculant (a polymer) together with an inorganic flocculent to the water to be treated.

In the aggregation precipitation apparatus according to the present invention, a filtering medium layer composed of a floatable filtering medium can be provided in the upper part of the first chamber so as to arrange the lower end of the filtering medium at a position higher than the upper end of the floc transfer pipe. Further, at least two floc transfer pipes may be installed and a horizontal baffle may be installed below each of the floc transfer pipes, and the horizontal positions of adjacent baffles can be arranged shifted up or down with one another. In addition, an agitation blade A rotatable in the horizontal direction may be provided in the upper part of the first chamber and can be arranged at a position higher than the upper end of the floc transfer pipe. Still further, an agitation blade B rotatable in the horizontal direction can be provided in the floc transfer pipe.

In the present invention, the separation tank may be divided into the first chamber in its upper part and the second chamber in its lower part by a partition wall, and the water to be treated may be allowed to flow into the first chamber, and pollutants in the water to be treated may be rendered coarse flocs, and simultaneously the flocs rendered coarse may be forcibly transferred to the second chamber through the floc transfer pipe, and accordingly the upward flow velocity above the upper end of the floc transfer pipe in the first chamber can be reduced up to a velocity capable of forming a floc blanket layer, in other words, up to a velocity of lower than the settling velocity of coarse flocs and the separated water in the first chamber can be clarified.

Furthermore, by arbitrarily regulating the upward flow to the water collection pipe for the separated water in the second chamber from the lower end of the floc transfer pipe within the range where the flocs transferred to the second chamber are settled, the separated water in the second chamber can also be clarified.

Namely, according to the present invention, the tank is divided into the upper part and the lower part, and in the first chamber of the upper part, solid-liquid separation is effected by forming coarse flocs and a floc blanket layer to provide clarified separated water in the first chamber, and simultaneously in the second chamber of the lower part, the flocs transferred from the first chamber is subjected to solid-liquid separation to provide clarified separated water in the second chamber.

In the aggregation precipitation apparatus according to the present invention, even when the formation of coarse flocs and a floc blanket layer in the first chamber is insufficient, by installing a filtering medium in the upper part of the first chamber, pollutants are allowed to pass through the filtering medium and eliminated to clarify the separated water in the first chamber. When the filtering medium is arranged in the first chamber, it is preferred to provide operations of suitably washing the filtering medium and peeling and removing trapped suspended solids (hereinafter referred to as "SS").

In the floc transfer pipe which transfers coarsened flocs from the first chamber to the second chamber, the water flow is a downward flow, and when it flows out of the lower end of the floc transfer pipe to the second chamber, the water flow reversely turns to come to an upward flow. In order to perform good solid-liquid separation, it is important to straighten the upward flow to render the upward flow velocity uniform on one hand, and in order to make the apparatus compact, it is preferred to shorten the vertical distance necessary for straightening the flow on the other hand. In addition, in order to increase the upward velocity in the second chamber, it is necessary to straighten the upward flow without fragmenting coarse flocs flowing out of the lower end of the floc transfer pipe. In order to straighten the upward flow without the fragmentation of the coarse flocs, it is preferred to set the flow velocity in the floc transfer pipe at 5 m/min or lower. Further, in the present invention, by installing a horizontal baffle below the floc transfer pipe, the water flow flowing out of the lower end of the floc transfer pipe can be changed into a lateral-directed flow by the baffle without the fragmentation of flocs.

Furthermore, in order to prevent the collision of the lateral flows of the water flow from the lower end of the floc transfer pipe with one another, it is preferred to shift up or down the position of adjacent baffles to be fixed. In this instance, the distance to be shifted up or down is preferably set at a distance of not shorter than the vertical distance between the lower end of the floc transfer pipe and the baffle.

By forming flocs into dense pellets, the flow velocity of the upward flow above the upper end of the floc transfer pipe in the first chamber can be increased, and also the flow velocity of the upward flow from the lower end of the floc transfer pipe in the second chamber to the water collection pipe for the separated water in the second chamber can be increased. In the present invention, by installing an agitation blade in the upper part of the first chamber to rotate it in the horizontal direction, coarse flocs in the floc blanket layer can be densified. Or by installing an agitation blade in the floc transfer pipe to rotate it, coarse flocs descending in the floc transfer pipe can be densified.

BRIEF EXPLANATION OF THE DRAWINGS

FIG. 1(a) is a cross-sectional constitution diagram of the aggregation precipitation apparatus; FIG. 1(b) is a cross-sectional view of part of installation of a water collection pipe for the separated water in the second chamber; and FIG. 1(c) is a schematic view showing an example of the flow rate regulation mechanism of an effluent pipe for the separated water in the second chamber.

BEST MODE FOR CARRYING OUT THE INVENTION

Next, the present invention will be explained in detail with the use of the drawings.

FIG. 1 to FIG. 4 are constitution diagrams showing various concrete examples of aggregation precipitation apparatus of the present invention.

In FIG. 1(a), numeral 1 is an aggregation precipitation apparatus; numeral 2 is a partition wall; numeral 3 is a first chamber; numeral 4 is a second chamber; numeral 5 is an effluent pipe for the separated water in the first chamber; numeral 6 is an influent pipe for raw water (water to be treated); numeral 7 is a water collection pipe for collecting the separated water in the second chamber; numeral 8 is an effluent pipe for the separated water in the second chamber; numeral 9 is a slurry drainage pipe: numeral 10 is a floc transfer pipe; numeral 11 is a baffle; numeral 12 is a transfer pump for the separated water in the second chamber; numeral 13 is a filter medium; numeral 14 is a filter medium layer; numeral 15 is a screen for preventing the outflow of the filter medium; numeral 16 is a filter medium receiving screen; numeral 17 is a scraper; and numeral 18 is a rotation shaft of the scraper. Further in FIG. 2, numeral 19 is a draft tube; in FIG. 3 numeral 20 is a agitation blade A; in FIG. 4 numeral 21 is an agitation blade B; and numeral 22 is a rotation shaft of the agitation blade B.

One example of the working embodiment of the present invention will be explained referring to FIG. 1(a). The aggregation precipitation apparatus 1 of the present invention is divided by a partition wall 2 into a first chamber 3 demarcated by the upper part of a tank and a second chamber 4 demarcated by the lower part of the tank. In the first chamber 3, an effluent pipe 5 for the separated water, in other words, clarified water in the first chamber is arranged in the upper part and an influent pipe 6 for raw water (water to be treated) is arranged in the lower part. In the second chamber 4, a water collection pipe 7 for the separated water in the second chamber for collecting the separated water in the second chamber, and an effluent pipe 8 for the separated water in the second chamber which is connected with the water collection pipe 7, are arranged in the upper part, and a slurry drainage pipe 9 for draining the slurry accumulated in the lower part is arranged in the lower part. The water collection pipe 7 for the separate water in the second chamber can be constituted by, for example, a member having a number of perforations on the upper surface of a pipe tube as shown in FIG. 1(b). In the partition wall 2, a floc transfer pipe 10 which communicates with the first chamber 3 and the second chamber 4 is vertically installed. The upper end of the floc transfer pipe 10 positions between the effluent section of the separated water in the first chamber and the influent section of raw water in the first chamber 3, and the lower end positions between the water collection pipe 7 for the separated water in the second chamber and the slurry drainage section in the second chamber 4. Below the floc transfer pipe 10, a baffle 11 can be arranged at a distance from the lower end of the floc transfer pipe 10. When a plurality of floc transfer pipes 10 are installed, the vertical positions of the baffles to be arranged below the flock transfer pipes can be shifted up or down with the positions of adjacent baffles.

The effluent pipe 8 for the separated water in the second chamber is connected with a transfer pump 12 for the separated water in the second chamber to regulate the effluent amount of the separated water in the second chamber. The use of a transfer pump is herein given as an example but on raising the effluent pipe 8 for the separated water in the second chamber, the effluent amount may be controlled by a moveable dam. At the bottom of the apparatus 1; a scraper 17 which is fixed to a rotation shaft 18 and rotates in the horizontal direction can be installed.

In the upper part of the first chamber 3, a filtering medium layer 14 to be constituted of a floatable filtering medium 13, a screen 15 for preventing the outflow of the filtering medium below the water surface above the filtering medium layer and a filtering medium receiving screen 16 below the filtering medium layer 14 can be installed.

FIG. 1(b) is a cross-sectional view of part of the installation showing the positions of a plurality of floc transfer pipes 10 and a plurality of water collection pipes for the separated water in the second chamber. In order to equalize the water amount flowing into the plurality of floc transfer pipes 10 from the first chamber 3, it is preferred to equally arrange the floc transfer pipes. Further, in order to uniformly collect the upward flow in the second chamber 4, it is preferred to equally arrange a plurality of water collection pipes 7 for the separated water in the second chamber in the same plane. In FIG. 1(b), an example of arranging a plurality of water collection pipes for the separated water is illustrated but when the number of water collection pipes for the separated water is decreased and straightening of flowing is not done by the water collection pipes, a straightening plate may be installed in the upper part of the second chamber to straighten flowing, and then the separated water can be collected.

FIG. 1(c) is a schematic view showing an example of the flow rate regulation mechanism of the effluent pipe 8 for the separated water in the second chamber. By regulating the effluent amount from the effluent pipe 8 for the separated water in the second chamber, it is possible to regulate the upward flow velocity in the upper part of the first chamber 3 and that in the upper part of the second chamber 4. In order to clarify the water to be separated in the second chamber while maintaining good solid-liquid separation in the second chamber 4, the turbidity of the separated water in the second chamber is continuously measured by a turbidimeter 27 and based on the measured turbidity, the flow rate of a transfer pump 12 for the separated water in the second chamber can be automatically controlled. The index of clarification is not limited to the turbidity and may be the concentration of SS. Further, the means to control the flow rate is not limited to a pump and may be a valve or a movable dam.

Figure 1:
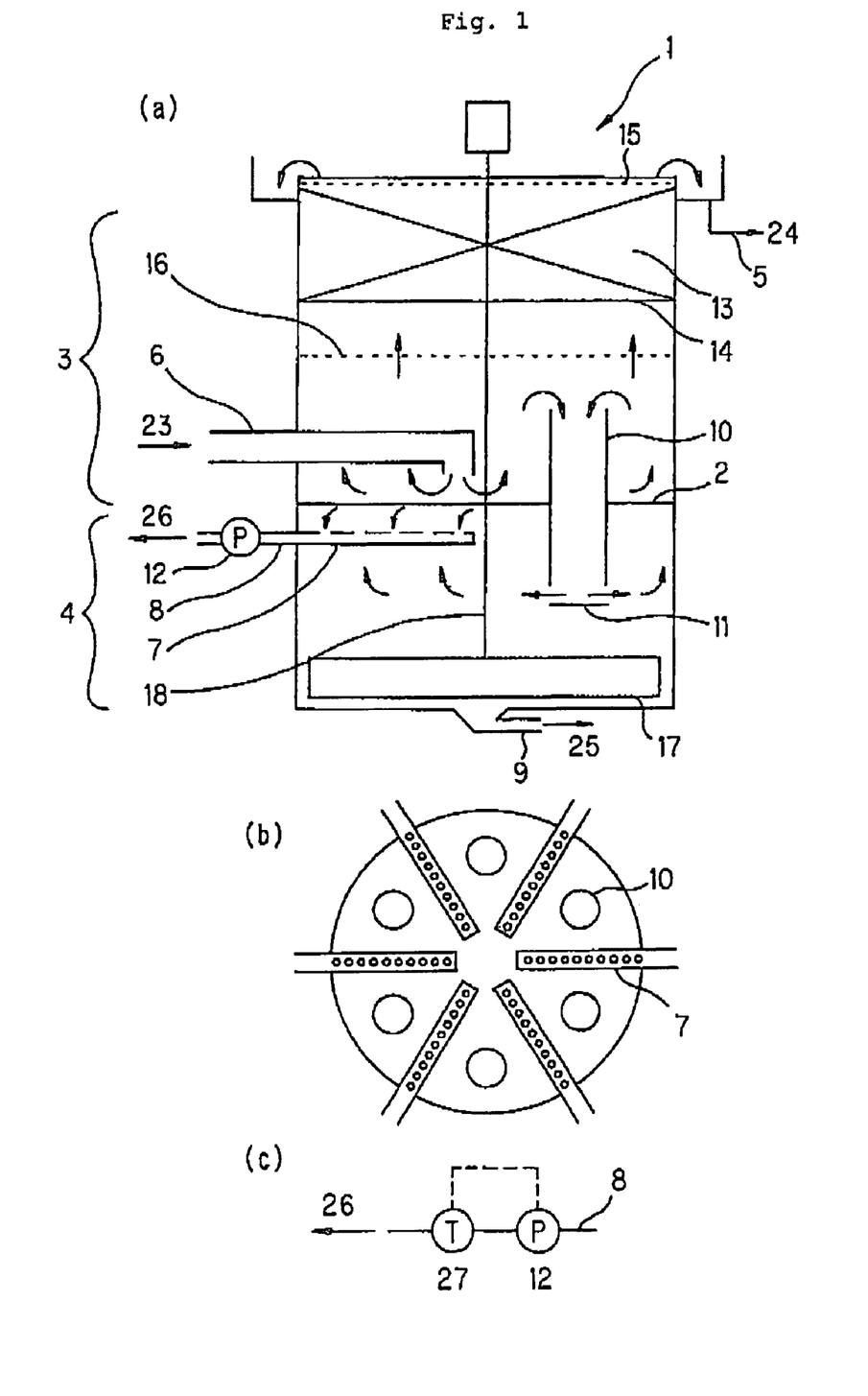
FIG. 1 is a constitution diagram of one example of the aggregation precipitation apparatus according to the present invention.

Next, the operations of the aggregation precipitation apparatus according to one embodiment of the present invention as shown in FIG. 1 will be explained.

The raw water 23 to which an inorganic flocculant such as ferric chloride and PAC and, if necessary, a polymer (an organic polymer flocculant) are successively added, flows from the influent pipe 6 for the raw water to the lower part of the first chamber 3, collides with the partition wall 2 and is horizontally dispersed and, simultaneously, reversely turns to come to an upward flow. By the agitation effect due to such a series of flowing, the pollutants in the water to be treated comes to flocs, and the collision of the flocs with one another and their integration proceed during rising of the flocs in the first chamber 3, and the flocks are slowly coarsened and the settling velocity thereof is increased. The transfer pump 12 for the separated water in the second chamber is operated and the water in the upper part of the second chamber is discharged through the water collection pipe 7 for the separated water in the second chamber and the effluent pipe 8. As a result, part of the water to be treated rising up to the upper end of the floc transfer pipe 10 in the first chamber 3 is forcibly transferred to the second chamber 4 through the flock transfer pipe 10. Accordingly, the upward flow velocity of the water flow above the upper end of the floc transfer pipe 10 becomes lower than the treatment velocity (the treatment velocity means herein a flow velocity obtained by dividing the amount of the water to be treated by the cross-sectional area of the tank). The treatment velocity is decreased to a flow velocity which can allow coarse flocs to settle by regulating the effluent amount of the separated water in the second chamber. As a result, in the first chamber 3, a floc blanket layer in which coarse flocs dwell is formed above the floc transfer pipe and by passing through this blanket layer, the water is separated from pollutants and passes through the filtering medium 14 as an upward flow and is discharged from the effluent pipe 5 for the separated water in the first chamber as the clarified separated water 24 in the first chamber.

In start-up early stages of the apparatus, the formation of coarse flocs and a floc blanket layer is insufficient, and the flocs having a low settling velocity rise with the treated water flow to the upper part of the first chamber. Such rising flocs are separated and removed by a filtering medium layer 14, and the clarified separated water 24 in the first chamber can be discharged from the effluent pipe 5 for the separated water in the first chamber.

On the other hand, the flocs descending in the flock transfer pipe 10 is changed in the flow direction to the lateral direction by a horizontal baffle 11 below the floc transfer pipe 10 to flow into the second chamber 4. The flocs settle in the lower part of the second chamber 4 and are collected by a scraper 17 and discharged as a concentrated slurry 25 from the slurry drainage pipe 9. The water from which flocs have been removed by settling is flown as upward flow, and collected by the water collection pipe 7 for the separated water in the second chamber and discharged as the clarified separated water 26 in the second chamber from the effluent pipe 8 for the separated water in the second chamber.

When the flow velocity of the descending flow in the floc transfer pipe is too fast, flocs colliding with the baffle are fragmented. Accordingly, it is preferred to regulate the descending flow velocity in the floc transfer pipe to 5 m/min or lower. Further, when a plurality of floc transfer pipes are installed, the vertical positions of the baffles are preferably arranged shifted up or down with adjacent baffles since the flows flowing in the lateral direction collide with one another to cause stir-up of flocs when the vertical positions of adjacent baffles are the same.

Figure 2:
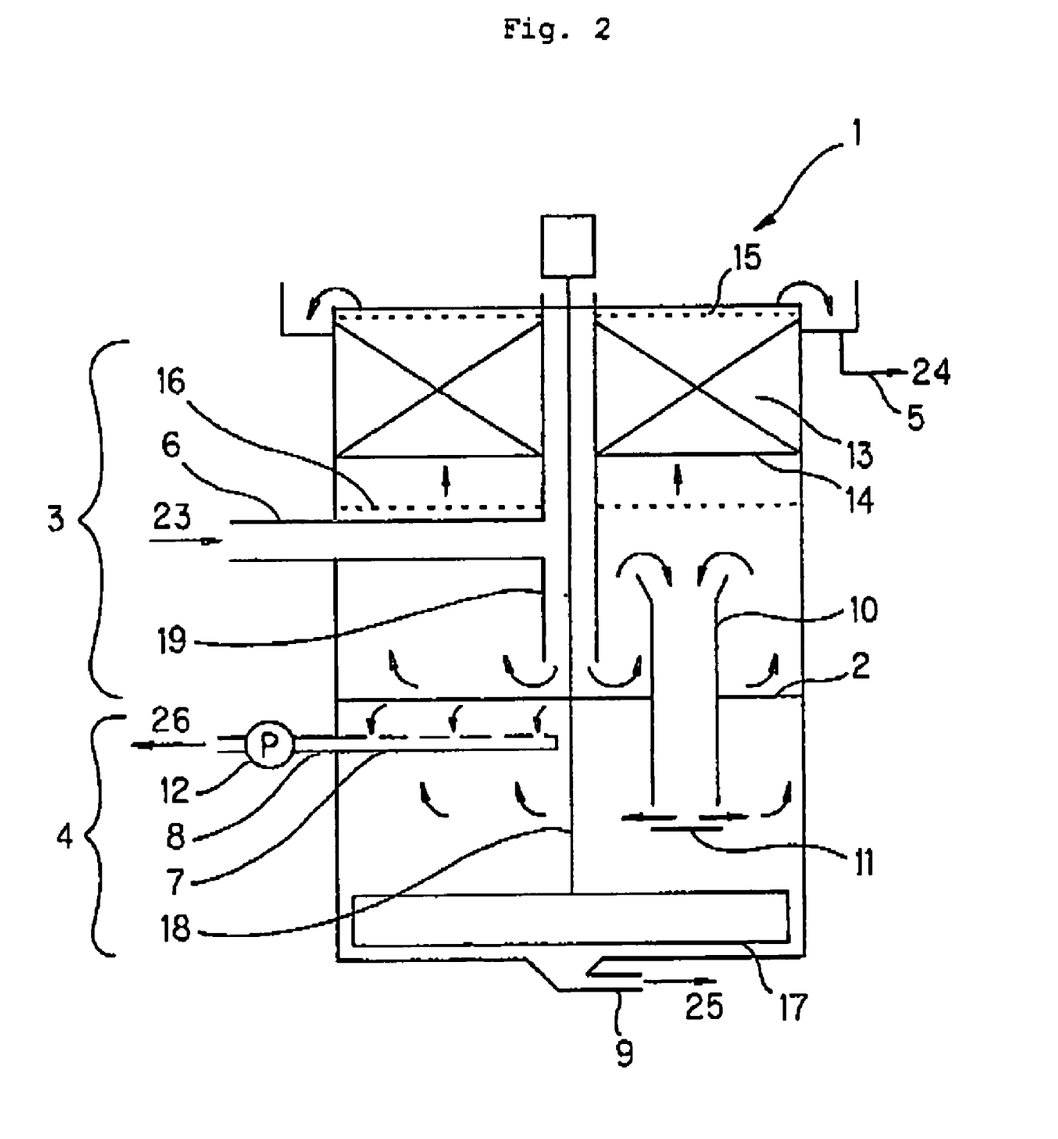
FIG. 2 is a cross-sectional constitution diagram showing another concrete example of the aggregation precipitation apparatus of the present invention.

FIG. 2 is a cross-sectional constitution diagram showing another example of the aggregation precipitation apparatus of the present invention. The different point from the apparatus of FIG. 1 resides in that the raw water flows into the lower part of the first chamber 3 through a draft tube 19 and the upper end of the floc transfer pipe 10 is broadened in the form of a funnel. The influent raw water can also be dividedly injected in the horizontal direction. Further, by broadening the upper end of the floc transfer pipe 10 in the form of a funnel, the effect of increasing the collection efficiency of flocs can be obtained.

Figure 3:
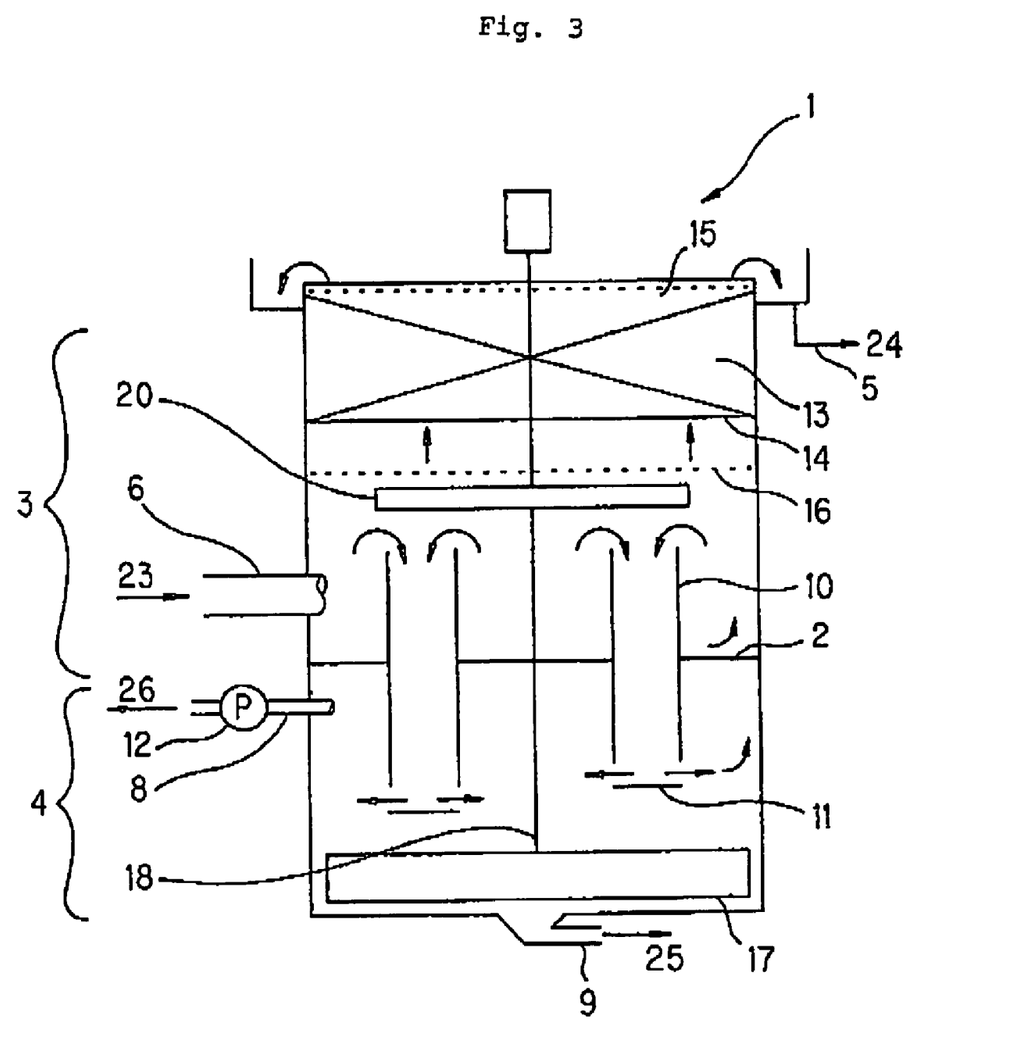
FIG. 3 is a cross-sectional constitution diagram showing another concrete example of the aggregation precipitation apparatus of the present invention.

FIG. 3 is a cross-sectional constitution diagram showing another example of the aggregation precipitation apparatus of the present invention. In the first chamber 3, an agitation blade A 20 which rotates in the horizontal direction is installed so as to position above the upper end of the floc transfer pipe 10. By rotating the agitation blade A 20, coarse flocs in the floc blanket layer is densified and pelletized and as a result, the solid-liquid separation in the first chamber 3 can be accelerated. Further, descriptions are abbreviated in FIGS. 1, 2 and 4 for the sake of simplification, but when a plurality of floc transfer pipes are installed, it is preferred to inhibit the stir-up of flocs by shifting up or down the vertical positions of the baffles below adjacent floc transfer pipes in as shown in FIG. 3.

Figure 4:
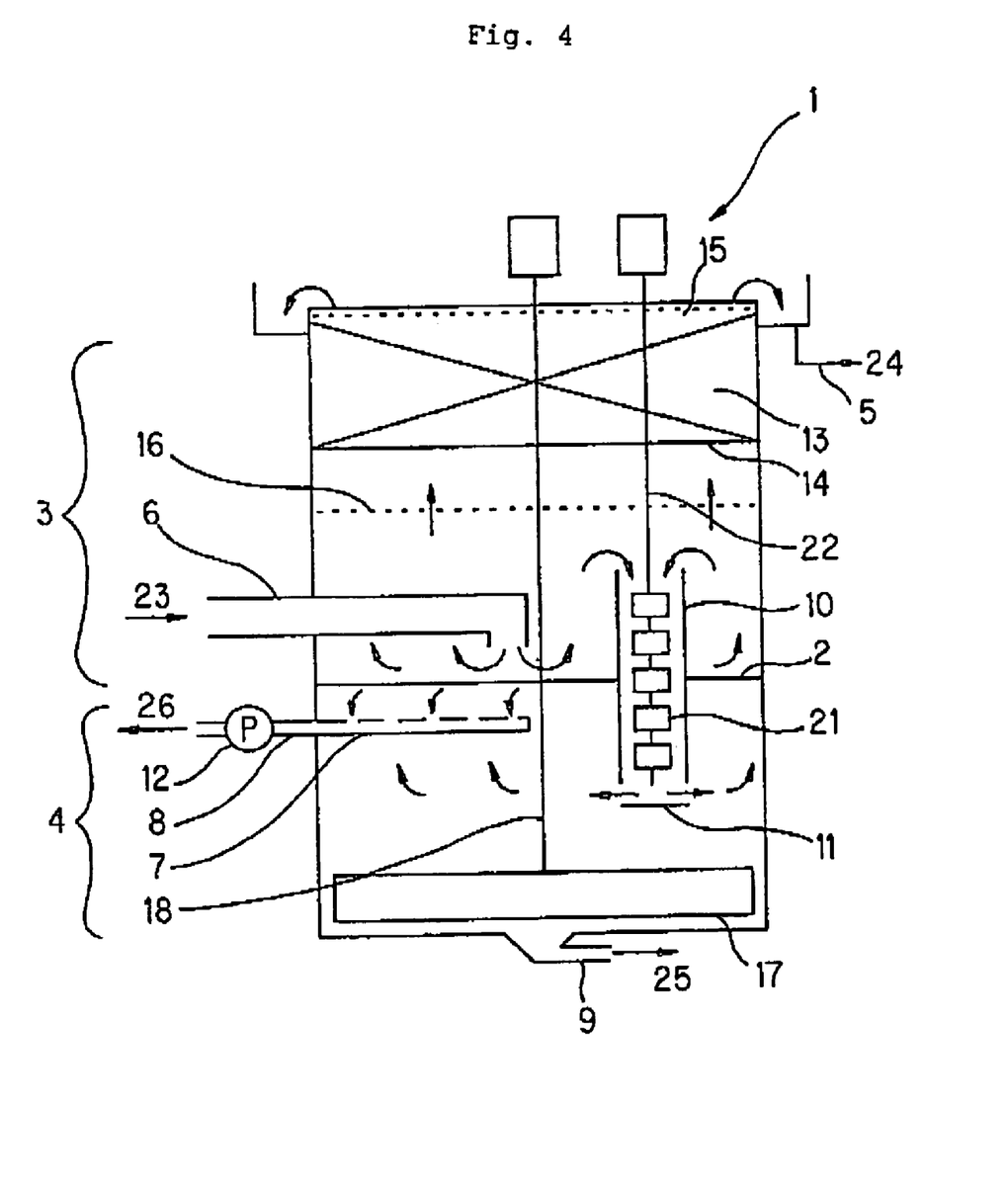
FIG. 4 is a cross-sectional constitution diagram showing another concrete example of the aggregation precipitation apparatus of the present Invention.

FIG. 4 is a cross-sectional constitution diagram showing another example of the aggregation precipitation apparatus of the present invention, and an agitation blade B 21 which is fixed to a rotation shaft 22 and rotates in the horizontal direction is installed in the floc transfer pipe 10. By rotating the agitation blade B 21, flocs descending in the floc transfer pipe 10 can be densified and pelletized, and the solid-liquid separation in the second chamber 4 is accelerated.

Working examples of the treatments based on the aggregation precipitation method of the present invention will be shown below. Example 1 and Example 2 are examples of using sewage as the water to be treated and Example 3 is an example of using river water after raining as the water to be treated. In any Examples, an experimental apparatus comprising a tank having an inner diameter of 340 mm, a total height of 3,500 mm, a height of the first chamber of 2,000 mm and a height of the second chamber of 1,500 mm and a constitution as shown in FIG. 1 was used.

EXAMPLE 1

An influent sewage of a preliminary settling tank was used as the water to be treated. To the water to be treated, 40 mg/L of $FeCl_3$ and 2 mg/L of a polymer ("EVERGROWTH LEA-209", a product of Ebara Corporation) were added as the flocculants. Treatment experiment was carried out with the use of the apparatus having a constitution as shown in FIG. 1 without installing a filtering medium layer 14. The results are shown in Table 1.

TABLE 1

| | Maximum Value | Minimum Value | Average Value in Initial 3 Hours |
|---|---|---|---|
| SS in Raw Water (mg/L) | 240 | 304 | 283 |
| SS in Separated Water in 1st Chamber (mg/L) | 30 | 208 | 50 |
| SS in Separated Water in 2nd Chamber (mg/L) | 32 | 198 | 49 |
| Treatment Velocity (m/h) | — | — | 60 |
| Upward Velocity in Upper Part of 1st Chamber (m/h) | — | — | 32 |
| Upward Velocity in Upper Part of 2nd Chamber (m/h) | — | — | 28 |

Addition Ratio of $FeCl_3$: 40 mg/L, Addition Ratio of Polymer: 2 mg/L

In the conventional aggregation precipitation treatment of the upward flow type, in the superhigh-velocity treatment having a treatment velocity of higher than 35 m/h, it is recognized that flocs do not settle and follows an upward flow of the treated water and overflows together with treated water. Contrast to this, according to the method of the present invention, even when the treatment velocity was 60 m/h, by regulating the upward flow velocity in the upper part of the first chamber to 32 m/h and the upward flow velocity in the upper part of the second chamber to 28 m/h, good solid-liquid separation could be performed in both the first chamber and the second chamber. The average value of SS in three hours after starting passing water was 50 mg/L with the separated water in the first chamber and 49 mg/L with the separated water in the second chamber while it was 283 mg/L with the raw water.

In the case of not installing the filtering medium layer, the formation of flocs in the first chamber was insufficient in start-up early stages, and the amounts of SS in both the separated water in the first chamber and that in the second chamber were high. The maximum value of SS In the separated water in the first chamber and that in the separated water in the second chamber as shown in Table 1 are the values 15 minutes after starting passing water, and it can be thought that these maximum values resulted by the influence of insufficient growth of flocs.

EXAMPLE 2

Figure 5:
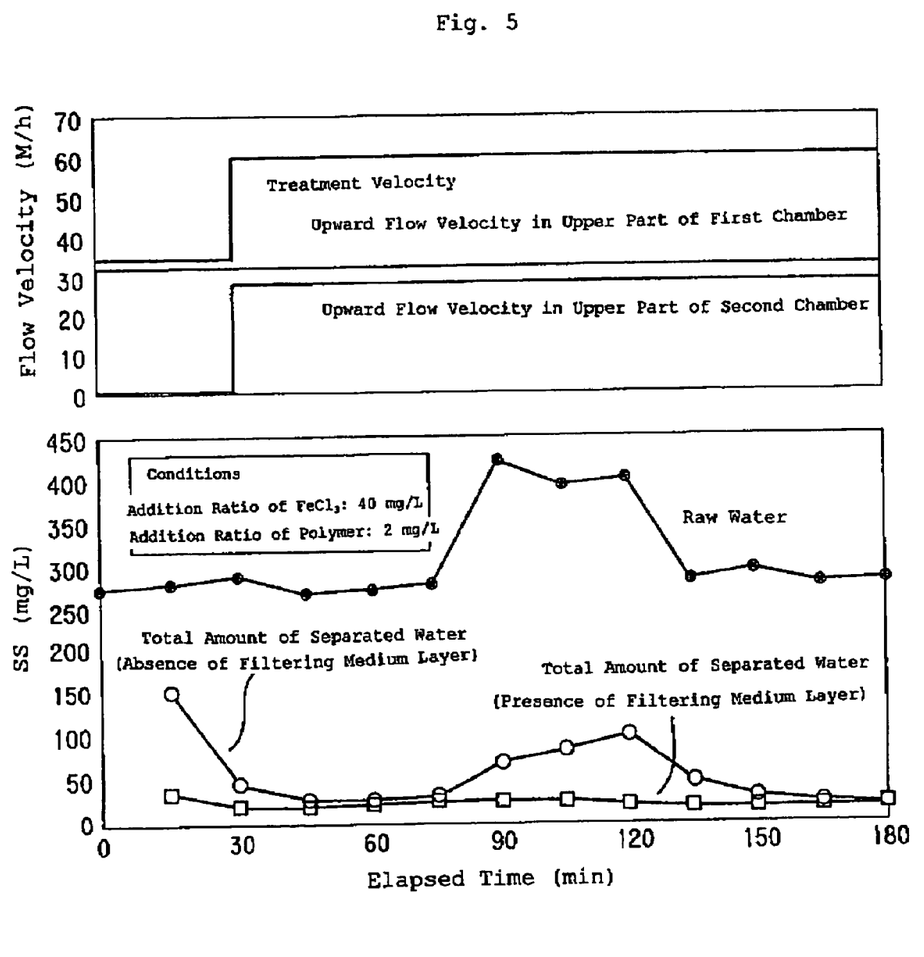
FIG. 5 is graphs showing the change in flow velocity with time and the change in SS with time, which illustrate the results of Example 2.

An influent sewage of a preliminary settling tank was used as the water to be treated. The flocculants were added to the water to be treated in the same manner as in Example 1 and aggregation precipitation treatment experiments were carried out in both oases of installing and not installing a filtering medium layer 14. The water property of the treated water is shown in FIG. 5. As the filtering medium, a number of hollow cylindrical floatable filtering media (having an inner diameter of 25 mm, an outer diameter of 27 mm and a length of 25 mm) were packed.

In the present example, treatment was carried out only in the first chamber in start-up early stages, and after flocs sufficiently grew (30 minutes after start-up) in the first chamber, withdrawing of the separated water in the second chamber was started.

In the case of not installing the filtering medium layer, the amounts of SS in the separated water at 15 minutes and 30 minute after start-up were 150 mg/L and 48 mg/L, respectively, on the other hand, in the case of installing the filtering medium layer, the amounts of SS in the separated water at 15 minutes and 30 minute after start-up were 35 mg/L and 22 mg/L, respectively.

Thus, the overflow of flocs were caused in start-up early stages when the filtering medium was absent and the installation of the filtering medium layer improved the overflow of flocs. This can be thought due to the result that insufficiently grown flocs were trapped and removed in passing through the filtering medium layer.

The amount of SS in the raw water rose up to about 400 mg/L at 90 minutes to 120 minutes after starting passing water. When the filtering medium layer was absent, the overflow of flocs were caused with the rise in the amount of SS, and the amount of SS in the separated water increased up to 100 mg/L. On the other hand, when the filtering medium layer was present, the amount of SS in the separated water maintained 20 to 30 mg/L in spite of the change in the water property of the raw water. Thus, even when the growth of flocs in the first chamber was insufficient due to the change in the amount of SS in the raw water, the installation of a filtering medium layer could prevent the deterioration of the water property of the separated water.

EXAMPLE 3

River water in rainy weather was used as the water to be treated. Treatment experiment was carried out in the same manner as in Example 2 while a filtering medium layer was installed. The filtering medium used was the same hollow cylindrical floatable filtering medium as in Example 2, and had an inner diameter of 25 mm and a length of 25 mm. In connection with the chemical addition ratio, PAC (10% A1203) was 35 mg/L and a polymer ("LEA-209", a product of Ebara Corporation) was 0.5 mg/L.

By setting the upward flow velocities in the upper parts of the first chamber and the second chamber at 25 m/h and 24 m/h while a treatment velocity was set at 50 m/h, respectively, the average amount of SS in three hours after starting passing water was 4.6 mg/L for the separated water in the first chamber and 4.8 mg/L for the separated water in the second chamber while it was 49 mg/L for the raw water. By installing the filtering medium layer, good SS removal efficiency could be obtained from start-up early stages.

INDUSTRIAL APPLICABILITY

As explained above, the present invention has a mechanism such that a tank is divided by a partition wall into an upper part (a first chamber) and a lower part (a second chamber), the upper part communicating with the lower part by a floc transfer pipe, and that the flocs formed in the first chamber are forcibly transferred to the second chamber and, simultaneously, solid-liquid separation is effected in both the first chamber and the second chamber. According to the present invention, the outflow of flocs can be prevented even under such circumstances that the treatment velocity is higher than the settling velocity of flocs. Further, a compact aggregation precipitation apparatus which does not deteriorate the turbidity elimination performance even in start-up early stages of the apparatus can be provided by installing a float filtering medium in its upper part.

The invention claimed is:

1. A method of aggregation precipitation treatment by adding an inorganic flocculant to water to be treated and agitating a resulting solution, which comprises:

introducing the agitated solution into an influent section in a lower part of a first chamber of a separation tank where flocs are allowed to grow and subjected to solid-liquid separation in a floc blanket layer and, simultaneously, separated water is discharged out of the tank from an effluent section in an upper part of the first chamber above the floc blanket layer, allowing the flocs grown in the floc blanket layer of said first chamber and part of the separated water to flow down through a floc transfer pipe into a second chamber provided below the first chamber at a velocity higher than the settling velocity of the flocs as such, concentrating the grown flocs, discharging a concentrated slurry in the second chamber, and simultaneously withdrawing separated water formed by the concentration of the flocs and the separated water in the first chamber which has been introduced into the second chamber together with the flocs from the upper part of the second chamber as the separated water, and inhibiting the fragmentation of the flocs in the lower part of the floc transfer pipe by regulating the total discharge flow rate of the separated water and the slurry in the second chamber so as to render the flow velocity in the floc transfer pipe to 5 m/min or lower, or automatically controlling an effluent amount of the separated water in the second chamber with an index of the turbidity or suspended substance concentration of the separated water in the second chamber, so as to render the upward flow velocity above the lower end of the floc transfer pipe in the second chamber lower than the settling velocity of the flocs.

2. The method of claim 1, comprising adding an organic polymer flocculant together with an inorganic polymer flocculant to the water to be treated.

3. The method of claim 1, comprising controlling the amounts of introducing the flocs and the separated water in the first chamber into the second chamber from the first chamber by regulating the amount of the separated water to be withdrawn from the second chamber.

4. The method of claim 1, comprising inhibiting the fragmentation of the flocs in the lower part of the floc transfer pipe by regulating the total discharge flow rate of the separated water and the slurry in the second chamber so as to render the flow velocity in the floc transfer pipe to 5 m/min or lower.

5. The method of claim 1, comprising automatically controlling an effluent amount of the separated water in the second chamber as an index of the turbidity or the suspended substance concentration of the separated water in the second chamber, so as to render the upward flow velocity above the lower end of the floc transfer pipe in the second chamber lower than the settling velocity of the flocs.

* * * * *